Dec. 27, 1938.    E. X. SCHMIDT    2,141,453
APPARATUS FOR CALORIMETRY OF COMBUSTIBLE FLUIDS
Filed Oct. 17, 1936    2 Sheets-Sheet 1
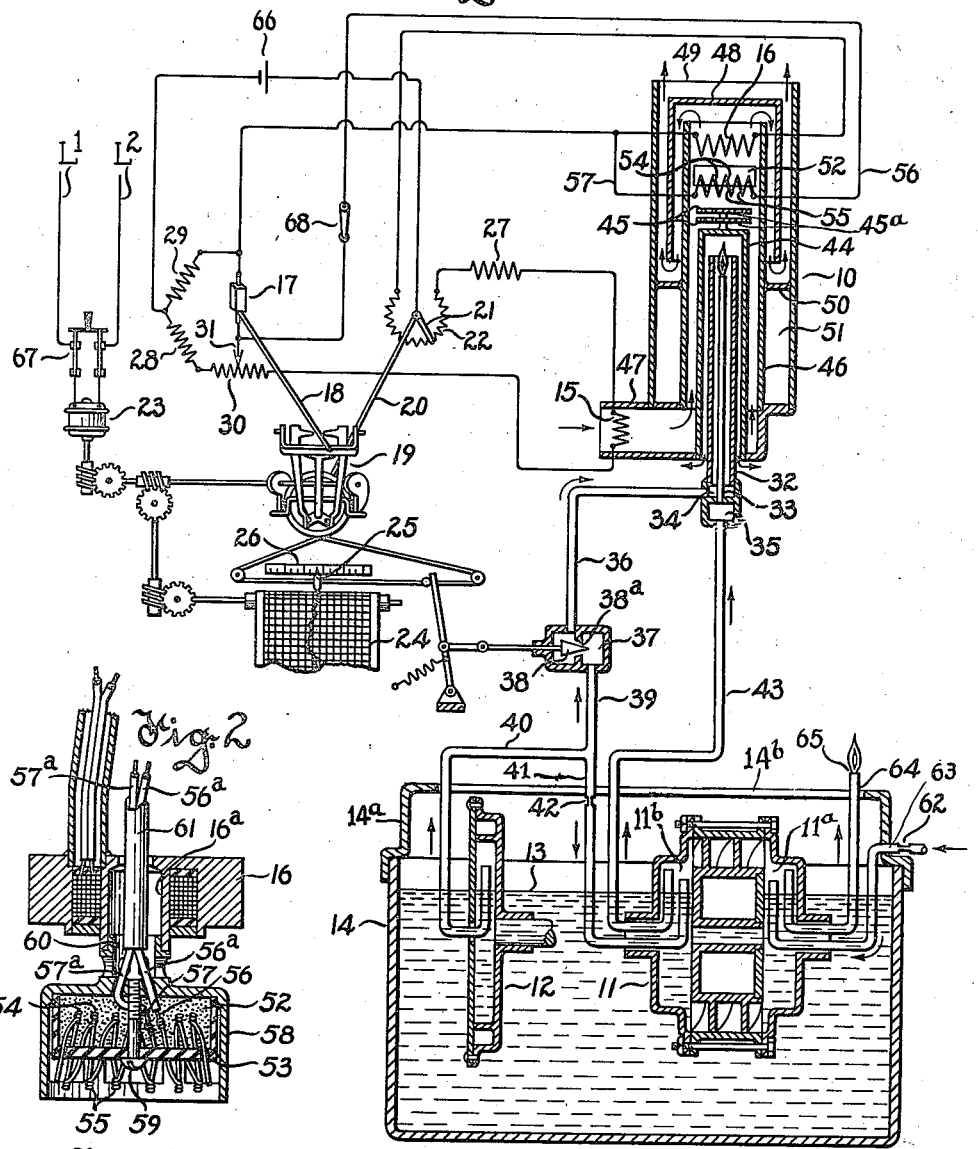
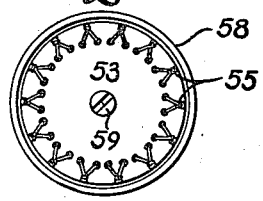
Inventor
Edwin X. Schmidt
By Frank H. Hubbard
Attorney Dec. 27, 1938.  E. X. SCHMIDT  2,141,453
APPARATUS FOR CALORIMETRY OF COMBUSTIBLE FLUIDS
Filed Oct. 17, 1936  2 Sheets-Sheet 2

Inventor
Edwin X. Schmidt
By Frank N. Hubbard
Attorney

Patented Dec. 27, 1938

2,141,453

UNITED STATES PATENT OFFICE 2,141,453

APPARATUS FOR CALORIMETRY OF COMBUSTIBLE FLUIDS

Edwin X. Schmidt, Whitefish Bay, Wis., assignor to Cutler-Hammer, Inc., Milwaukee, Wis., a corporation of Delaware Application October 17, 1936, Serial No. 106,177

19 Claims. (Cl. 73—190)

This invention relates to improvements in apparatus for calorimetry of combustible fluids.

A primary object is to provide calorimetric apparatus wherein the time lag of response to changes in the total heating value per unit volume of the test fluid is minimized or substantially eliminated.

Another object is to provide for modification, in a relatively simple manner, of known calorimetric apparatus whereby the same are rendered more sensitive and more rapid in response to variations in the total heating value per unit volume of the combustible fluid, and hence more accurate in the determinations afforded thereby.

Another object is to provide apparatus in calorimetry for producing a differential electrical effect as a function of variations in the rate of heat liberated by combustion of the test gas, utilizing the value of such differential effect for substantially instantaneously modifying the reading of the calorimeter recorder, and thereafter gradually reducing to zero the value of said differential effect.

Another object is to provide novel and simple accessory means for a known type of calorimeter whereby the result last mentioned may be attained.

Another object is to utilize such improved apparatus to minimize the degree of "hunting" and/or over-adjustment of the calorimeter control elements.

A more specific object is to provide an electrothermally responsive device for use in conjunction with a known form of calorimeter to provide for acceleration of the rate of response of the latter to variations in the total heating value per unit volume of the fluid undergoing test.

Another object is to provide a calorimeter having novel means associated therewith for automatically varying the relative proportionality of the primary and secondary air employed to support combustion of the test fluid, in a manner to compensate for a time lag in response of the calorimeter parts to variations in the instantaneous total heating value per unit volume of the test fluid.

Another object is to provide a calorimeter of the precision type wherein changes in the total heating value per unit volume of the test fluids to be normally ascertained and recorded thereby, subject to a predetermined time lag, are anticipated and/or instantaneously ascertained and recorded thereby.

Another object is to provide a calorimeter having all of the aforementioned auxiliary elements applied thereto to increase the accuracy and improve the operating characteristics of the device as a whole.

Another object is to provide for attainment of all of the aforementioned desirable results without sacrificing any of the desirable results heretofore attained by such calorimeters.

Other objects and advantages of the invention will become apparent in the course of the following description.

The accompanying drawings illustrate certain embodiments of the invention which will now be described, it being understood that the embodiments illustrated are susceptible of modification in respect of certain details of construction thereof within the scope of the appended claims.

In the drawings,

Figure 1 illustrates schematically and diagrammatically a calorimetric device the parts of which are constructed and arranged in accordance with my invention.

Fig. 2 is a vertical sectional view of the so-called outlet thermometer of a calorimeter having one form of my thermometric anticipator applied thereto or associated therewith.

Fig. 3 is a bottom plan view of the device illustrated in Fig. 2.

Figure 4:
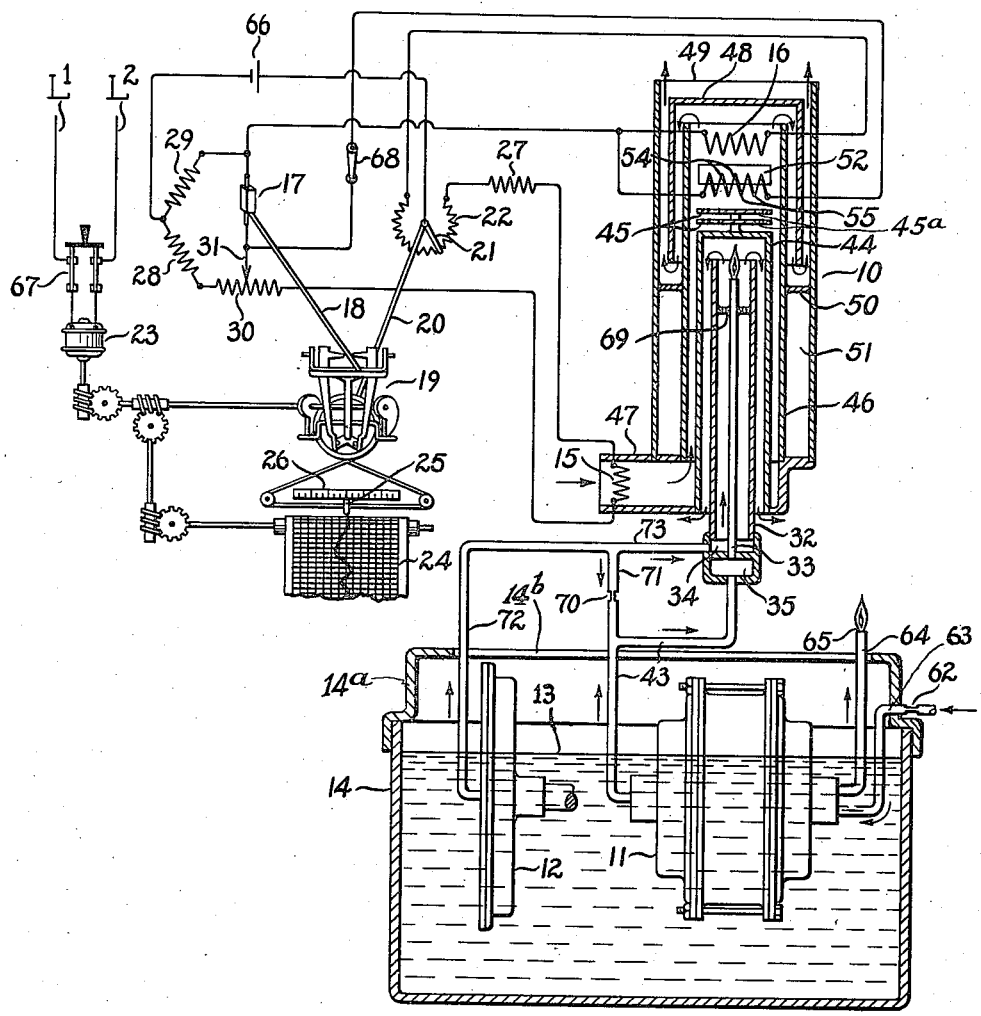
Figure 5:
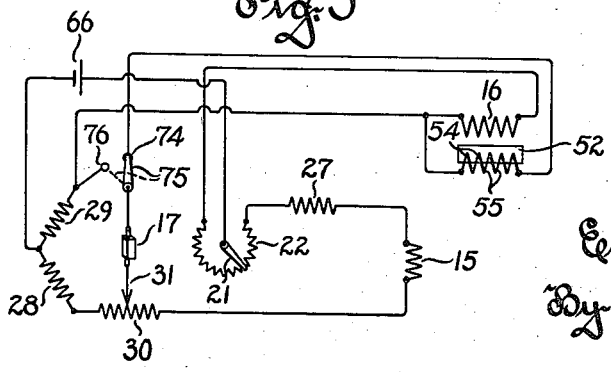

Fig. 4 illustrates schematically and diagrammatically a modified form of calorimetric device the parts of which are constructed and arranged in accordance with my invention, and Fig. 5 is a simplified diagram of a Wheatstone bridge control circuit similar to those illustrated in Figs. 1 and 4,—but embodying a modified arrangement of parts to provide for selective inclusion or exclusion of the aforementioned anticipator,—the latter when included having a relationship to the bridge circuit somewhat different from that of Figs. 1 and 4.

In the Packard Patents No. 1,625,277, granted April 19, 1927, and No. 1,662,802, granted March 13, 1928, are disclosed and claimed precision type calorimeters to which the various features of the present invention are particularly applicable. Here, as in said Packard Patents Nos. 1,625,277 and 1,662,802, test gas, combustion air and cooling air are supplied under like conditions of temperature, pressure and saturation, and in regulated proportions by volume, to a burner for combustion of the gas and combustion air and absorption by the cooling air of the heat so liberated. Resistance thermometers, or the like, are arranged in the stream of cooling air to be subjected respectively to the temperature of the latter before and after the heat exchange, said resistance thermometers being connected in a Wheatstone bridge having associated devices arranged to be influenced thereby for operating a suitable instrument to indicate the total heating value per unit volume of the test gas.

The form of apparatus herein illustrated embodies the principle of said Packard Patents Nos. 1,625,277 and 1,662,802, wherein a constant volumetric proportioning of the test gas and cooling air is maintained, the combustion air being also constantly proportioned to effect complete combustion of the gas. Any variation in the total heating value per unit volume of the test gas thus tends to cause variation in the temperature difference of the resistance thermometers with consequent unbalancing of the bridge circuit, and such variation is utilized to actuate a rheostat in a manner to restore the balance of the bridge circuit, the degree and character of the rheostat regulation thus effected being indicated by the recorder.

Referring first to Fig. 1, the same illustrates an associated gas burner and heat exchange device indicated generally at 10, both of said elements being, in general, of known form. The three fluids aforementioned are supplied through suitable conduits to said device by means of pumps including a gas pump 11, a combustion air pump 12, and a cooling air pump (not shown), each of said pumps preferably comprising a wet displacement meter structure having a common liquid seal 13 comprising water or other liquid contained within a tank 14. Tank 14 is preferably provided with a suitable cap or cover 14a, which is provided with an opening, such as that indicated at 14b, to afford communication between the interior of the tank and atmosphere. Said pumps are further adapted to be power driven at speeds bearing a constant ratio to one another as by means of a suitable motor (not shown) of the character illustrated in said Packard Patent No. 1,662,802.

Thermometer resistances 15 and 16 are so associated with the device 10 as to be subjected respectively to the temperature of the cooling fluid before and after the heat exchange. Said resistance thermometers are utilized in a Wheatstone bridge to control a galvanometer 17, the needle 18 associated therewith being utilized in conjunction with a well known form of control mechanism indicated in general at 19. Such control mechanism is of the character disclosed in Patent No. 1,125,699, dated January 19, 1915, to Leeds. Thus the coil of galvanometer 17 effects deflection of the needle 18 whose sense and extent of deflection control the sense and extent of movement of the shaft or movable structure 20, one end of which carries a contactor 21 slidable over the contacts of a resistance 22 to equalize values of the Wheatstone bridge containing the respective thermometer resistances 15 and 16 whereby the bridge circuit is balanced automatically during testing of the combustible fluid.

In other words, the deflecting system of the galvanometer controls a disengageable mechanical connection between the electric motor 23 and the shaft 20 whose direction and extent of movement depend upon the sense and extent of deflection of the needle 18. The recording paper or sheet 24 is advanced at a constant rate by the motor 23 past the marker or pen 25 which is moved transversely of the record sheet by a flexible connection between the same and shaft 26. The pen 25 is adapted to coact with a stationary scale 26 to indicate directly the instantaneous total heating value per unit volume of the fluid being tested.

Included in the bridge circuit in series with the thermometer resistance 15 is a fixed resistance 27 the resistance value of which is equal to that of resistance 22. The purpose of resistance 27 is to bring the Wheatstone bridge circuit into balance when the contactor 21 is at that end (the right-hand end) of resistance 22 which corresponds with the left-hand end of scale 26; or, in other words, when no heat is being imparted to the flow of cooling fluid between thermometer resistances 15 and 16. The Wheatstone bridge circuit of course includes the usual fixed resistances 28 and 29, and said bridge circuit may be initially balanced by means of a suitable variable resistance 30, the adjustable contactor for which is shown at 31.

Referring more specifically to the structure of the device 10, the same comprises a pair of concentrically arranged tubes 32 and 33 which constitute the burner proper, the lower ends of said tubes respectively communicating with chambers 34 and 35. Chamber 34 communicates through conduit 36 with a chamber 37 containing a needle-type valve 38, the purpose of which will be hereinafter described; and chamber 37 communicates through branch conduit 39 and conduit 40 with the discharge side of the combustion air pump 12. The other branch conduit 41 leads from conduit 40 to the discharge end or chamber of the gas pump 11, an orifice plate or constriction 42 being preferably provided in branch conduit 41 to normally proportion the volume of primary combustion air supplied to the discharge end of pump 11 for mixture with the gas sample. The chamber 35 communicates through conduit 43 with the aforementioned discharge end of pump 11.

From the foregoing arrangement it results that in the operation of the device the chamber 35 and tube 33 are filled with a mixture of gas and primary combustion air. The chamber 34 and tube 32 on the other hand are adapted to contain only secondary combustion air. The arrangement, including orifice plate 42, is preferably such that the mixture of gas and primary air within tube 33 is non-combustible. That is to say, the proportion of air in the mixture is preferably insufficient to support combustion of the gas, whereby it results that the mixture arriving at the upper end of tube 33 is incapable of combustion except by virtue of the additional supply of combustion air furnished through the tube 32. The upper end of tube 32 is preferably projected a substantial distance above the adjacent portion of the inner tube 33 for promoting an intimate mixture of such additional supply of combustion air with the aforedescribed non-combustible mixture of gas and air substantially at the point of combustion.

A cap 44 having a closed upper end and longitudinally extending side walls is arranged above and about the upper end of the burner aforedescribed for causing the products of the aforedescribed combustion to flow downwardly in heat exchanging relation to the flow of cooling fluid and also to the flow of combustion gases prior to burning of the latter. The cap 44 is preferably provided above its upper end with a plurality of spaced plates 45 having perforations 45a which assist in transferring to the stream of cooling fluid the heat produced by the aforementioned combustion, while additionally insuring a zigzag or meandering path for the flow of cooling air.

A tubular jacket 46 is arranged to surround the cap 44 aforedescribed, being adapted at its lower end to communicate with a conduit 47 through which the cooling air is supplied from a third pump (not shown) which is preferably of the wet displacement type, and is also positioned in tank 14 and partly submerged within the body of liquid 13. Said jacket 46 preferably extends a material distance above cap 44, the upper end of the former being open and unobstructed.

A cap 48 having a closed upper end is arranged above and about the aforedescribed open end of jacket 46, said cap being open at its lower end and providing a downward or return flow passage for the cooling air as the same escapes from said jacket. In practice such open lower end of the cap 48 is arranged at approximately the same level as the upper end of the inner tube 33 of the burner, whereby the cooling air is constrained to flow about and in heat exchanging relation with the upward flowing column of such air within the jacket 46 to or even below the point of combustion.

The cooling air after acting upon the thermometer resistance 16, is still at approximately the highest temperature attained during the heat exchange, and hence the aforedescribed reflexed flow of such air about the jacket 46 serves to minimize loss of heat of the heated cooling air within said jacket by convection or radiation to the atmosphere. To further assist in preventing such heat losses, I prefer to provide a tubular jacket 49 the open upper end of which extends a substantial distance above the upper end of cap 48. The closed lower end of jacket 49 is preferably flush with the lower end of jacket 46, and said jacket 49 is provided at a point below the lower end of cap 48 with a closure ring or annulus 50, whereby a further reflexed path is provided for the flow of cooling air. Moreover, the annular or tubular dead air space 51 thus provided around the lower portion of the device 10 minimizes the effect of variations in ambient temperature upon the operation of the device.

The thermometer resistance 15 is preferably located as illustrated within the conduit 47 at a point sufficiently removed from the point of combustion and the path of flow of the products of combustion to render such thermometer resistance subject solely to the temperature of the entering cooling air and independent of the combustion. The thermometer resistance 16 on the other hand is located within the upper portion of the jacket 46 and preferably directly above the inner cap 44 (with its heat radiating plates or disks 45) whereby said thermometer resistance is subjected to the temperature of the cooling fluid immediately following completion of the main heat exchange.

The thermometer resistances 15 and 16 are constructed of a suitable material or materials selected and calibrated in the manner set forth in the aforementioned Packard Patent No. 1,662,802, whereby the temperature-resistance curve or curves thereof respectively are such as to provide automatic compensation for the known or recognized tendencies toward error in the determinations thereof; or, more accurately, the differential of the opposing tendencies toward error, while maintaining similarity of structure and characteristics thereof.

I have thus far described the essential or desirable elements of a precision type or accurate calorimeter of the character disclosed in the aforementioned Packard patents. As is well known, however, one inherent defect of calorimeters of such character is their time lag. That is, the time lag in complete response thereof to variations in the total heating value per unit volume of the gas undergoing test. Certain factors tending to produce a definite and appreciable time lag in response of the complete calorimetric device, are the time lag in response of the exit thermometer resistance and the time lag of the burner parts. I refer specifically to the lag in response of a properly integrated thermometer resistance, and the lag produced by an efficient jacketing arrangement for the calorimeter burner, both of which items introduce substantial mass, which mass obviously requires an appreciable time interval for attainment of a given temperature.

One manner of compensating for or minimizing the effect of this time lag is to introduce or position in the stream of cooling air (just beyond the point of the main heat exchange between the combustion products and said air) a mass of metal or other suitable material. The rate of heat transfer from the stream of air to this mass is preferably poor, so that considerable time will elapse before the mass assumes the temperature (or the changed temperature) of the stream of air. Such a mass is shown diagrammatically at 52 in Fig. 1; and as shown more in detail in Fig. 2, such mass 52 may comprise a quantity of sand or other suitable finely divided material contained within a cup-shaped insulating member 53.

In close thermal contact with mass 52 (as, for instance, embedded within said mass) are the slowly responding junctions 54 of a multiplicity of thermocouples, which thermocouples comprise pairs of wires of selected materials. For instance, one wire of each pair may be formed of iron and the other of copper; or one wire of each pair may be composed of a suitable alloy of nickel and chromium and the other may be composed of a suitable alloy of copper and nickel. The other (or quickly responding) junctions 55 of the respective thermocouples are located exteriorly of the member 53. Thus the arrangement is such that the fast junctions 55 quickly assume the temperature of the stream of cooling air.

Wire leads 56 and 57 from the adjacent free ends of the series of thermocouples are connected, as shown in Figs. 1 and 4, in parallel with the circuit of the coil of the galvanometer 17 of the Wheatstone bridge. It follows that any difference in temperature between the fast junctions 55 and the slow junctions 54 of the thermocouples will generate an electromotive force which is added to or subtracted from the potential which is impressed upon the coil of the galvanometer 17.

In practice I prefer to support the cup-shaped insulating member 53 within the open lower end of an inverted cup-shaped metal member 58 which is cast or machined to the form illustrated, a single screw 59 being utilized for attachment of said parts to each other. The upper end of member 58 is provided with a pair of openings (Fig. 2) to accommodate the insulated portions 56ª, 57ª of the wires 56 and 57. Member 58 is provided at its upper end with a laterally perforated nipple 60, the same being threaded, brazed or otherwise rigidly attached to the hollow central portion 16ª of thermometer 16, said hollow portion providing a through passage for a part of the stream of cooling fluid and for the insulated cord 61 comprising the wires 56, 57.

In operation of the complete device as constructed in accordance with my invention, if the heat liberated at the burner remains constant the temperature of the stream of cooling air (after the heat exchange) remains constant. Accordingly the fast and slow junctions of the series of thermocouples will be at like temperatures; and hence what I prefer to call the "anticipator" (as represented by the series of thermocouples) will have no effect upon the measuring system of the calorimeter.

However, when the rate of heat liberation changes, the burner cap and the stream of cooling air change in temperature at a comparatively rapid rate. The temperature of the fast junctions 55 of the thermocouples also changes at a comparatively rapid rate, but the temperature of the slow junctions 54 changes rather slowly. There is, therefore, a potential difference set up between the leads or wires 56 and 57, and if the galvanometer 17 had previously been balanced this added potential will cause a deflection of the galvanometer resulting in a change in the reading of the recorder, as represented by the position of the pen 25. The circuit connections, of course, are such that an increase in the rate of heat input would cause an increase in the indication or reading of the recorder.

If the rate of heat liberated at the burner remained fixed at the new or changed rate the slow junctions 54 of the thermocouples would gradually assume the same temperature as the fast junctions 55. At the same time the exit thermometer resistance 16 and the return-flow jacketing elements of the calorimeter would also assume their new stabilization temperature. If the rate of heating and cooling of the aforementioned mass 52 could be perfectly matched with respect to the rate of heating and cooling of the exit thermometer resistance 16 and the jacketing elements, and if the electromotive force generated by the thermocouples is properly proportioned relatively to the other elements of the bridge circuit, the recorder (24, 25) would respond almost instantly to a change in the rate of heat input or heat liberation at the burner; the recorder assuming, and remaining at, the new rate of heat input.

In practice it is not possible to perfectly match these changes; wherefore it follows that the recorder cannot be made to respond instantly and remain at the exact new value in respect of all possible degrees of change in the rate of heat liberation at the burner. However, I have found that the rate of change of the superimposed effect can be modified over relatively wide limits (to compensate for the major portion of the variable conditions which it is expected will be encountered in respect of a given installation); such effect being modified as by changing or varying the efficiency or rate of heat transfer between the stream of cooling air and the mass 52, and/or by changing the rate or amount of ventilation around said mass.

The value of the electromotive force superimposed upon the galvanometer system may be changed by a choice of the materials employed in constructing the thermocouples, by increasing or decreasing the number of thermocouples connected in the aforedescribed series, and/or by connecting an adjustable resistance of suitable value in parallel circuit relation to the thermocouple or thermocouples employed.

As will be apparent to those skilled in the art, an effect similar to that produced by the thermocouples arranged as herein shown may be obtained by employment of a pair of auxiliary thermometer resistances substituted for and arranged in the relative positions of the slow and fast junctions respectively of the thermocouples, said thermometer resistances being connected in the Wheatstone bridge circuit in the manner of the thermocouples, to produce a similar temporary unbalance of the Wheatstone bridge in the event of a change in the total heating value per unit volume of the test gas. However, the flexibility (that is, change in number to be employed) of thermocouples, the ease of installation thereof as an accessory for precision calorimeters of a well known type, and other factors, make the use of thermocouples preferable to the use of auxiliary thermometer resistances. Accordingly I intend to claim herein the use of thermocouples, or the substantial equivalents thereof, in conjunction with calorimeters to provide for attainment of the results hereinabove set forth.

The aforedescribed accessory (including the series of thermocouples or equivalent devices arranged in the manner described, and which I have termed the "anticipator") thus acts to increase the accuracy and rapidity of response of a precision type calorimeter of the character herein contemplated, by substantially neutralizing or compensating for the time lag of response of the complete calorimeter to variations in the total heating value per unit volume of the test gas, as an incident to the mass involved in the exit thermometer resistance and the jacketing means for the burner.

I prefer to provide additional means for further modifying the operative characteristics of the calorimeter to neutralize or eliminate other factors tending to produce a time lag in response thereof to variations in the total heating value per unit volume of the test gas. Said means relates essentially to the manner of controlling or handling the combustion air and the gas supplied to the calorimeter burner.

Thus, in Fig. 1 the continuous sample of gas passes through orifice 62 and conduit 63 into the inlet chamber 11ª of the meter or pump 11, and the excess thereof, above the amount normally drawn through the pump, is permitted to pass through conduit 64 to be burned at tip 65 of the latter. In this manner the time lag caused by the capacity of the inlet chamber, which capacity cannot be reduced beyond certain limits, is partially eliminated. A similar arrangement is employed at the exit end of the pump, by having the primary combustion air enter from branch conduit 41 and mix with the sample of gas in chamber 11ᵇ, thereby decreasing the time lag at this point.

A further decrease in time lag, which in effect is somewhat similar to (and cumulative with respect to) the effect produced by the "anticipator", is provided by employment of the needle valve 38, which affords a variable size orifice 38ª in the secondary combustion air line 39, 36. The effective area of opening of orifice 38ª is controlled by needle valve or plunger 38, the movement of which in turn depends on the reading of the chart or recorder of the calorimeter, or more particularly upon the relative position of the recorder pen 25. This arrangement offers two advantages in the operation of a precision type calorimeter of the character herein contemplated. In the first place it enables use of a given calorimeter for measurement of the total heating value per unit volume of a larger number of gases of different quality; or, in other words, the operative range of B. t. u. measurement of a given calorimeter is increased.

Furthermore, with the arrangement of parts as just described, when there is an increase in the total heating value of the gas sample, resulting in a change in the reading of the recorder, an increase is automatically effected in the rate of flow of primary combustion air, with a consequent increase in the rate at which the mixture of gas and primary combustion air is delivered to the calorimeter burner. Inasmuch as at such time the mixture of gas and primary combustion air filling chamber 11$^b$ and conduits 43 and 33 has a total heating value depending upon the total heating value of the test gas and the rate at which primary combustion air had previously been added, the increase in the rate of flow of this mixture will temporarily increase the rate of liberation of heat at the burner. A similar effect is produced in the opposite direction (that is, a temporary decrease in the rate of heat liberation at the burner) when the total heating value of the test gas decreases, as will be obvious.

The arrangement shown, therefore, has a tendency to temporarily increase or decrease the rate at which heat is liberated at the burner, depending upon whether the recorder reading is increasing or decreasing. The effect of the arrangement is therefore to increase the speed of movement of the recorder pen 25 during the interval when the time lag of the burner parts tends to restrain the recorder parts from going to the new correct reading.

It will be apparent to those skilled in the art that the variable orifice 38$^a$, 38 could be located at some other point in the system; as, for instance, in the branch conduit 41 forming the primary air line,—in which case its direction of adjustment would have to be reversed, to provide for an increase in size of the orifice upon an increase in total heating value of the gas and vice versa.

The Wheatstone bridge circuit, Fig. 1, is supplied with direct current from a suitable cource,— such source being represented herein by the battery 66. Motor 23 may be supplied with energy from a suitable source of either alternating or direct current, as represented by lines $L^1$, $L^2$,— a manually operable switch 67 being provided for completing or interrupting the motor circuit. In order to provide for initially balancing the Wheatstone bridge circuit in the usual manner, as by means of the adjustable contactor 31 in conjunction with resistance 30, I employ a manually operable switch 68, which when opened disconnects the series of thermocouples 54, 55 from the bridge circuit.

In the modification illustrated in Fig. 4, most of the calorimeter parts may be identical with the corresponding parts aforedescribed, and the same have been given like numerals of reference. In Fig. 4, however, a secondary combustion air orifice plate 69 is positioned between tubes 32 and 33 at a point where the temperature increases as the rate of heat liberation at the burner increases.

Let it be assumed that gas having a total heating value of 1500 B. t. u. is being supplied to a calorimeter having a 1500 B. t. u. range. In order to get a satisfactory burner flame under these conditions the effective areas of the primary air orifice 70 (in branch conduit 71) and the secondary orifices in plate 69 would be so proportioned relatively to each other that twenty per cent. of the total combustion air supplied by combustion air meter 12 enters the burner as primary combustion air (namely, .42 cubic foot per hour), the remainder of the combustion air (namely, 1.68 cubic feet per hour) entering the burner as secondary air. The secondary air when passing through the orifices in plate 69 has been heated to a temperature depending upon the rate at which heat is being liberated at the burner, and obviously also depending upon structural details of the equipment. Except for the primary air orifice 70, located at a point where the primary air is substantially at tank temperature and the secondary air orifices in plate 69, located at a point where the temperature is higher than the tank temperature by an amount depending upon the rate of heat liberation at the burner, the conduits between the combustion air meter and the burner are of sufficient size so that for all intents and purposes no flow regulating devices are present, and are not required.

As shown in Fig. 4 the combustion air pump 12 discharges into a conduit 72, a branch 73 thereof leading to chamber 34, and the branch 71 thereof leading through orifice 70 for juncture thereof with conduit 43, which conveys the mixture of gas and primary air to chamber 35,—this arrangement differing to some extent from that shown in Fig. 1.

Under the aforedescribed conditions, let it be further assumed that at a given time a decrease in the total heating value per unit volume of the gas should occur. At the end of a short period of time, corresponding to the time lag in getting the new (or lower heating value) gas through the gas meter and piping to the burner, the rate of heat input to the burner will decrease, which almost immediately decreases the temperature of the secondary air as it passes through the secondary air orifice plate 69. The density of the secondary air as it passes through orifice plate 69 is therefore increased, but the total volume of the combustion air which must be divided by the orifices into primary and secondary air flows has been decreased due to the thermal contraction of the air. The pressure drops across the primary and secondary air orifices therefore decrease, but remain equal to each other. The rate of flow of primary air in standard cubic feet therefore decreases, whereas the rate of flow of secondary air increases (due to said increase in density thereof).

As a consequence of this change in the rate at which primary air mixes with the gas, there is a decrease in the rate of flow of the mixture of gas and primary air to the burner. Inasmuch as the mixture of gas and primary air between the point of mixture and the point of combustion thereof in the burner has a lower heating value per cubic foot than the mixture of gas and primary air feeding into the conduit 43 (as a result of the decrease in rate of flow of the primary air), the rate at which heat will be liberated will be decreased (due to the decrease in rate of flow of the mixture) for the time interval required to force such lean mixture out of the conduit to the burner tip.

More specifically, with a 1500 B. t. u. gas on a 1500 B. t. u. range calorimeter, the rate of heat input to the burner would be 180 B. t. u. per hour.

Primary air is being supplied at a rate of .42 cubic foot per hour and gas at a rate of .12 cubic foot per hour, so that the mixture of gas and primary air has a total heating value of 334 B. t. u. per cubic foot. If the total heating value of the gas at the discharge end of gas meter 11 should change to 1350 B. t. u. per cubic foot, the total heating value of the mixture of gas and primary air entering the mixed gas conduit 43 would change to 300 B. t. u. per cubic foot, the rate of flow of the mixture of gas and primary air remaining at .54 cubic foot per hour; and until the leaner mixture has displaced the previously made mixture of 334 B. t. u. per cubic foot in the conduit, the heat input to the burner remains at 180 B. t. u. per hour, then drops to 163 B. t. u. per hour, thus lowering the temperature of the air passing through the secondary air orifice plate 69; with the result that less primary air flows through orifice 70 in conduit 71 for mixture with the gas supplied through conduit 43.

Tests conducted by me have shown that with the secondary air orifice plate 69 located near the tip of burner tube 33 the percentage change in the rate of flow of primary air is equal to approximately one-third of the percentage change in total heating value per unit volume of the test gas. Thus, with a 10 per cent. decrease in total heating value of the test gas (say, from 1500 B. t. u. per cubic foot to 1350 B. t. u. per cubic foot) the volumetric rate of flow of primary air will decrease approximately 3 per cent. Therefore, during the interval beginning with the time when the 300 B. t. u. mixture starts burning and ending with the time when the same has been completely swept out of the conduit, the heat input to the burner will be: [(.97) (.42) +.12]300, or 158 B. t. u. per hour.

The 300 B. t. u. mixture in the piping is being displaced by a mixture of .97 times .42 cubic foot of air, or .4074 cubic foot of air, and .12 cubic foot of gas, thus producing a mixture having a total heating value of approximately 309 B. t. u. per cubic foot; and when the mixture reaches the burner the rate of heat input will again be approximately 163 B. t. u. per hour. Thus, during the time required to sweep out the conduit between the gas meter and the burner the heat input to the burner is approximately 3 per cent. lower than it is and should be after conditions have again stabilized with the new heating value gas. This temporary reduction in heat input produces an effect of temporarily exaggerating the reduction in gas heating value and partly assists in overcoming or compensating for the time lag of the burner and of the calorimeter recorder.

As indicated in the description of the device of Fig. 1, a similar result is produced when the change in volumetric proportionality of primary air and secondary air of combustion is effected mechanically in accordance with the recorder reading, or by the use of some other thermo-mechanical device affected by the rate of heat input to the burner. Obviously in such thermo-mechanical arrangement a greater degree of change in the split of combustion air can be obtained than can be obtained by the direct expansion of the air in passing through the secondary air orifice plate (as described in connection with Fig. 4), but the thermo-mechanical arrangement possesses certain disadvantages in respect of the operation thereof, principally in respect of the mechanical or moving parts involved, and in respect of the time lag involved in making the split.

As indicating how much change in the split of primary and secondary air is desirable for ideal conditions in respect of compensating for time lag; it may be stated that for ideal combustion of most gases the maintenance of a constant ratio between the total heating value of the test gas and the volumetric rate of flow of primary combustion air appears desirable. Such an amount or degree of change in the split of primary and secondary combustion air would, however, be too great, so far as the purpose of speeding up the rate of response of the calorimeter recorder is concerned. Accordingly, it is to be understood that in the thermo-mechanical arrangement illustrated in Fig. 1, the form of the needle or movable element 38 will be such as to provide a percentage change in the volumetric rate of flow of primary air which is less, to the desired extent, than the percentage change in total heating value of the test gas.

In the modified form of combined Wheatstone bridge and "anticipator" shown in Fig. 5 the several parts thereof may be identical with the corresponding parts of Figs. 1 and 4, and the same have been given like numerals of reference. In Fig. 5, however, the left-hand terminals of thermometer resistance 16 and of the series of thermocouples 54, 55 are connected, in common, through resistances 29, 28 and the left-hand portion of balancing resistance 30 by contactor 31 to one terminal of the coil of the galvanometer 17, the right-hand terminal of the series of thermocouples 54, 55 being connectable by stationary and movable contacts 74 and 75 with the other terminal of said coil, whereas the right-hand terminal of thermometer resistance 16 is connected by resistances 22, 27, 15 and the right-hand portion of balancing resistance 30 through contactor 31 to said first mentioned terminal of said coil.

Any electromotive force generated by the series of thermocouples 54, 55 will act in an obvious manner to effect a degree and sense of unbalance of the bridge circuit corresponding to the value and direction of said electromotive force. The contactor 75 may be moved to the position thereof indicated in dotted lines to engage a stationary contact 76, whereby the series of thermocouples is disconnected from the bridge circuit, to provide for initial balancing thereof in the usual manner, as by means of resistance 30 and contactor 31. It is to be understood, of course, that the combination of elements shown in Fig. 5 may be substituted for the similar combination of elements shown in each of Figs. 1 and 4.

What I claim as new and desire to secure by Letters Patent is:

1. In a recording calorimeter, in combination, a burner, means for supplying to said burner a continuous volumetrically constant flow of combustible gas, means for also supplying to said burner a continuous volumetrically proportioned flow of a fluid adapted to support combustion of said gas, means comprising a plurality of electrical elements of different thermal sensitivity to be subjected to the heating effect produced by combustion of said gas, said elements being so arranged with respect to each other as to produce a differential electrical effect as a function of variations in the rate at which heat is liberated by such combustion, associated means responsive to the value of such differential effect for substantially instantaneously modifying the reading of the calorimeter recorder, and said different electrical elements having thermal characteristics so related to each other as to provide for gradual reduction to zero value of said differential effect.

2. In a calorimeter of the precision type, in combination, a burner, means for supplying a continuous and substantially constant flow of combustible fluid the heating value per unit volume of which is to be ascertained, means for supplying a continuous flow of air which is definitely proportioned volumetrically with respect to said combustible fluid to support and assist in combustion of the latter, means for mixing said combustible fluid, prior to combustion, with a portion of said flow of air insufficient to support combustion, means for directing said mixture and the remainder of said air to said burner to effect combustion thereof, means for subjecting a continuous flow of another fluid to the heating effect of such combustion, thermometric means for ascertaining the value of such heating effect upon said last mentioned flow of fluid, means for utilizing variations in the value of such heating effect with reference to a given value as a measure of the variations in the total heating value per unit volume of said combustible gas, and associated means for supplementally and substantially instantaneously modifying the indicated measure of such thermometrically ascertained value as a function of variations in said total heating value per unit volume of said combustible gas, whereby variations in the total heating value per unit volume of said combustible fluid to be subsequently ascertained by said thermometric means are anticipated.

3. In a calorimeter, in combination, a burner, means for supplying to said burner a continuous volumetrically constant flow of combustible gas, means for also supplying to said burner continuous flows of primary and secondary air which are initially volumetrically proportioned relatively to each other and to said flow of gas to support combustion of the latter, means comprising a thermal element to be subjected to the heating effect of the combustion aforementioned, said element being arranged to provide an electrical controlling effect which varies in value as a function of variations in said heating effect, but subject to an inherent time delay, means for utilizing the value of said electrical controlling effect as a continuous measure of the total heating value per unit volume of said combustible gas, means also responsive to variations in said heating effect to automatically effect corresponding variations in the volumetric proportionality of said primary and secondary flows of air, said last mentioned means acting to increase the volumetric rate of flow of primary air in response to an increase in value of said heating effect, to thereby temporarily further increase the value of said heating effect to an abnormal degree, and said last mentioned means acting to decrease the volumetric rate of flow of primary air in response to a decrease in value of said heating effect, to thereby temporarily further decrease the value of said heating effect to an abnormal degree, and to thereby compensate to a predetermined degree for said inherent time delay.

4. In a precision type calorimeter wherein a volumetrically constant flow of cooling fluid is maintained separate from but subjected to the heating effect of the products of combustion of a volumetrically constant flow of combustible gas in the presence of a volumetrically proportioned flow of combustion air, the combination with a Wheatstone bridge circuit including a thermal element to be subjected to the temperature of the cooling fluid prior to the heat exchange and a thermal element to be subjected to the temperature of the cooling fluid subsequent to the heat exchange, means including said thermal elements to provide for unbalancing of the Wheatstone bridge to a degree corresponding to the difference in temperature of said first mentioned and second mentioned thermal elements, but subject to an inherent time delay, means including a galvanometer and an adjustable resistance device subject to control thereby, said adjustable resistance device being operable automatically in a direction and to a degree to effect re-balancing of the bridge circuit, means responsive to the degree of operation of said adjustable resistance device to continuously indicate directly the total heating value per unit volume of said combustible gas, and electro-thermally responsive means associated with said second mentioned thermal element and also subjected to the temperature of the cooling fluid subsequent to the heat exchange, said electro-thermally responsive means being substantially instantaneously responsive to variations in said last mentioned temperature of the cooling fluid to effect a corresponding direction and degree of unbalance of the bridge circuit, whereby the inherent time delay aforementioned is substantially eliminated.

5. In a precision type calorimeter wherein a volumetrically constant flow of cooling fluid is maintained separate from but subjected to the heating effect of the products of combustion of a volumetrically constant flow of combustible gas in the presence of a volumetrically proportioned flow of combustion air, the combination with a Wheatstone bridge circuit including a thermal element to be subjected to the temperature of the cooling fluid prior to the heat exchange and a thermal element to be subjected to the temperature of the cooling fluid subsequent to the heat exchange, means including said thermal elements to provide for unbalancing of the Wheatstone bridge to a degree corresponding to the difference in temperature of said first mentioned and second mentioned thermal elements, but subject to an inherent time delay, means including a galvanometer and an adjustable resistance device subject to control thereby, said adjustable resistance device being operable automatically in a direction and to a degree to effect re-balancing of the bridge circuit, means responsive to the degree of operation of said adjustable resistance device to continuously indicate directly the total heating value per unit volume of said combustible gas, electro-thermally responsive means associated with said second mentioned thermal element and also subjected to the temperature of the cooling fluid subsequent to the heat exchange, said electro-thermally responsive means being substantially instantaneously responsive to variations in said last mentioned temperature of the cooling fluid to effect a corresponding direction and degree of unbalance of the bridge circuit, whereby the inherent time delay aforementioned is substantially eliminated, said electro-thermally responsive means comprising a series of electrically connected thermocouples having fast junctions located within and directly subjected to the temperature of said cooling fluid at or closely adjacent to the point of highest temperature of the latter, and having slow junctions so arranged as to be subjected gradually to the temperature of said cooling fluid at a rate proportional to the value of said inherent time delay.

6. In a precision type calorimeter, in combination, an electrical controlling circuit including a thermometer resistance to be subjected to the heating effect of combustion of a continuous flow of test gas whereby a corresponding electrical controlling effect is provided, said thermometer resistance having an inherent time lag in response thereof to variations in temperature which are a function of variations in the total heating value per unit volume of the test gas, an electrothermally responsive device included in said controlling circuit and associated with said thermometer resistance and being likewise subjected to said heating effect, said last mentioned device being substantially instantaneously responsive to variations in temperature as a function of change in said total heating value, and said last mentioned device being adapted during the aforementioned time lag of said thermometer resistance to provide in said circuit an electrical controlling effect corresponding to the electrical controlling effect to be eventually provided by said thermometer resistance.

7. In a precision type calorimeter, in combination, an electrical controlling circuit including a thermometer resistance to be subjected to the heating effect of combustion of a continuous flow of test gas whereby a corresponding electrical controlling effect is provided, said thermometer resistance having an inherent time lag in response thereof to variations in temperature which are a function of variations in the total heating value per unit volume of the test gas, an electrothermally responsive device included in said controlling circuit and associated with said thermometer resistance and being likewise subjected to said heating effect, said last mentioned device being substantially instantaneously responsive to variations in temperature as a function of change in said total heating value, said last mentioned device being adapted during the aforementioned time lag of said thermometer resistance to temporarily provide in said circuit an electrical controlling effect corresponding to the electrical controlling effect to be eventually provided by said thermometer resistance, and said last mentioned device including means adapted to decrease the value of the electrical controlling effect produced thereby at a rate substantially corresponding to the rate of increase in value of the electrical controlling effect provided by said thermometer resistance.

8. In a precision type calorimeter, in combination, an electrical controlling circuit including a thermometer resistance to be subjected to the heating effect of combustion of a continuous flow of test gas whereby a corresponding electrical controlling effect is provided, said thermometer resistance having an inherent time lag in response thereof to variations in temperature which are a function of variations in the total heating value per unit volume of the test gas, an electrothermally responsive device comprising a thermocouple included in said controlling circuit and associated with said thermometer resistance and being likewise subjected to said heating effect, said last mentioned device being substantially instantaneously responsive to variations in temperature as a function of change in said total heating value, said last mentioned device being adapted during the aforementioned time lag of said thermometer resistance to temporarily provide in said circuit an electrical controlling effect corresponding to the electrical controlling effect to be provided by said thermometer resistance, and said last mentioned device including means adapted to decrease to zero the value of the electrical controlling effect produced thereby with respect to a given variation in said total heating value, within a period of time corresponding to the time lag of said thermometer resistance.

9. In a precision type calorimeter, in combination, a burner, means to supply to said burner continuous volumetrically proportioned flows of test gas, combustion air and cooling fluid under like conditions of temperature, pressure and saturation, for combustion of the test gas and absorption by the cooling fluid of the heat liberated by the combustion, a Wheatstone bridge circuit including a pair of thermal elements to be respectively subjected to the temperature of said cooling fluid before and after such heat absorption, means responsive to the difference in the temperatures of said thermal elements and to variations in said difference to effect unbalancing of the Wheatstone bridge circuit whereby the total heating value per unit volume of the test gas is continuously ascertained and indicated, the outlet thermal element having an inherent time lag in response as an incident to the mass of the same and of the burner parts, means including a thermocouple having two junctions subjected to substantially the same temperature conditions as said outlet thermal element and electrically connected with said Wheatstone bridge circuit, one junction of said thermocouple being substantially instantaneously responsive to variations in temperature of the cooling fluid after said heat absorption and the other junction thereof having a time lag in response to such variations substantially corresponding to the time lag of said outlet thermal element, said thermocouple being adapted to generate an electromotive force substantially corresponding to the degree of variation in the total heating value per unit volume of the test gas, and said electromotive force being adapted to effect a corresponding degree of unbalance of the Wheatstone bridge circuit, whereby the controlling effect to be provided by said thermal elements is anticipated.

10. In a precision type calorimeter, in combination, a burner, means to supply to said burner continuous volumetrically proportioned flows of test gas, combustion air and cooling fluid under like conditions of temperature, pressure and saturation, for combustion of the test gas and absorption by the cooling fluid of the heat liberated by the combustion, a Wheatstone bridge circuit including a pair of thermometer resistances to be respectively subjected to the temperature of said cooling fluid before and after such heat absorption, means responsive to the difference in the temperatures of said thermometer resistances and to variations in said difference to effect unbalancing of the Wheatstone bridge circuit whereby the total heating value per unit volume of the test gas is continuously ascertained and indicated, the outlet thermometer resistance having an inherent time lag in response as an incident to the mass of the same and of the burner parts, means including a thermocouple having two junctions subjected to substantially the same temperature conditions as said outlet thermometer resistance and electrically connected with said Wheatstone bridge circuit, one junction of said thermocouple being substantially instantaneously responsive to variations in temperature of the cooling fluid after said heat absorption and the other junction thereof having a time lag in response to such variations substantially corresponding to the time lag of said outlet thermometer resistance, said thermocouple being adapted to generate an electromotive force substantially corresponding to the degree of variation in the total heating value per unit volume of the test gas, and said electromotive force being adapted to effect a corresponding degree of unbalance of the Wheatstone bridge circuit, whereby the controlling effect to be provided by said thermometer resistances is anticipated, the second mentioned junction of said thermocouple being adapted to attain the temperature of the cooling fluid at a rate corresponding to the rate of response of the outlet thermometer resistance to such temperature, whereby the value of the electromotive force produced by said thermocouple is gradually reduced to zero.

11. In a precision type calorimeter, in combination, a burner, means to supply to said burner continuous volumetrically proportioned flows of test gas, combustion air and cooling fluid under like conditions of temperature, pressure and saturation, for combustion of the test gas and absorption by the cooling fluid of the heat liberated by the combustion, a Wheatstone bridge circuit including a pair of thermometer resistances to be respectively subjected to the temperature of said cooling fluid before and after such heat absorption, means responsive to the difference in the temperatures of said thermometer resistances and to variations in said difference to effect unbalancing of the Wheatstone bridge circuit whereby the total heating value per volume of the test gas is continuously ascertained and indicated, the outlet thermometer resistance having an inherent time lag in response as an incident to the mass of the same and of the burner parts, means including a thermocouple having two junctions subjected to substantially the same temperature conditions as said outlet thermometer resistance and electrically connected with said Wheatstone bridge circuit, one junction of said thermocouple being substantially instantaneously responsive to variations in temperature of the cooling fluid after said heat absorption and the other junction thereof having a time lag in response to such variations substantially corresponding to the time lag of said outlet thermometer resistance, said thermocouple being adapted to generate an electromotive force substantially corresponding to the degree of variation in the total heating value per unit volume of the test gas, said electromotive force being adapted to effect a corresponding degree of unbalance of the Wheatstone bridge circuit, whereby the controlling effect to be provided by said thermometer resistances is anticipated, means for initially dividing said flow of combustion air into primary and secondary flows which are definitely volumetrically proportioned relatively to each other, means responsive to variations in the rate of heat liberation at said burner, as an incident to variations in the total heating value per unit volume of the test gas, to automatically vary the proportionality of said primary and secondary flows, such variation in proportionality being adapted to temporarily accentuate the value of the variations in the rate of heat liberation, to thereby further compensate for the inherent time lag in response of the calorimeter as a whole.

12. In a calorimeter, in combination, means for effecting a continuous volumetrically constant flow of combustible gas, means for effecting a continuous volumetrically proportioned flow of air to support combustion of said gas, a burner to which said gas and air are supplied for combustion thereof, a thermometer resistance and a thermocouple of different thermal sensitivity to be subjected to the thermal effect of such combustion and electrically connected with each other in a manner to produce a differential electrical effect as a function of variations in the rate at which heat is liberated by such combustion, and associated means for substantially instantaneously modifying the reading of the calorimeter in accordance with the value of said differential electrical effect, said thermometer resistance and said thermocouple being so related to each other as to gradually reduce to zero the value of said differential electrical effect, for the purpose set forth.

13. In apparatus for ascertaining the total heating value per unit volume of a continuous flow of combustible gas, the combination with means for effecting continuous combustion of definitely proportioned quantities of said gas and air, of means for maintaining said gas and air at like conditions of temperaure, pressure and saturation, means for mixing said gas, prior to combustion, with a portion of said air insufficient to support combustion, means for directing said mixture and the remainder of said air to the desired point of combustion, means comprising a continuous stream of cooling fluid to be subjected to the heating effect of such combustion, thermometric means for ascertaining the value of such heating effect upon said stream of fluid, subject to a time lag, means for utilizing variations in the value of such heating effect with reference to a given value as a measure of the variations in the total heating value per unit volume of said combustible gas, means for supplementally and simultaneously ascertaining the value of such heating effect independently of said time lag, and means for substantially instantaneously modifying the indicated measure of such thermometrically ascertained value in accordance with variations in said total heating value per unit volume of said gas as supplementally ascertained whereby the total heating value per unit volume of said combustible gas to be subsequently ascertained thermometrically is anticipated.

14. In a calorimeter, in combination, thermometric means for continuously ascertaining the variable value of the heating effect of combustion of a combustible fluid, said thermometric means having an inherent time delay in response thereof to variations in such value, means for providing for said calorimeter a controlling effect corresponding to said thermometrically ascertained value, and associated means for supplementally and substantially instantaneously modifying the controlling effect so provided, in accordance with instantaneous variations in the value of said heating effect, to thereby compensate for said inherent time delay.

15. In a calorimeter, in combination, means for producing at a predetermined rate a controlling effect as a function of temperature change, means for producing at a relatively more rapid rate a second controlling effect as a function of said temperature change, and means for modifying the controlling effect first mentioned in accordance with the value of said second controlling effect, said last mentioned means being adapted to gradually reduce to zero the value of the controlling effect second mentioned in accordance with variations in the controlling effect first mentioned.

16. In apparatus for continuously and substantially instantaneously ascertaining the total heating value per unit volume of a combustible fluid, the combination with means for effecting combustion of definitely proportioned quantities of such fluid and other fluid, means for continuously supplying and maintaining said fluids under like conditions of temperature, pressure and saturation, means for mixing certain of said fluids prior to combustion with less than the total quantity of other of said fluids, means for supplying the remainder of such other of said fluids to support and assist in the combustion, means for thermometrically ascertaining the heating effect of such combustion, means for providing a controlling effect corresponding to the ascertained value of said heating effect, subject to a time lag, whereby the total heating value per unit volume of said combustible fluid is indicated, means for additionally and substantially instantaneously ascertaining the heating effect of such combustion to provide a second controlling effect, and means for modifying the controlling effect first mentioned in accordance with the value of said second mentioned controlling effect, to thereby compensate for the time lag in said means for providing said first mentioned controlling effect.

17. In a calorimeter, in combination, means for effecting a continuous volumetrically constant flow of combustible gas, means for effecting combustion of said gas in the presence of primary and secondary flows of air which are initially volumetrically proportioned relatively to each other and to said flow of gas, means for utilizing said combustion to produce a thermal effect the value of which tends to vary directly in accordance with variations in the total heating value per unit volume of said gas, electro-thermally responsive means for ascertaining the value of said thermal effect, subject to an inherent time delay, means for utilizing said ascertained value as a continuous measure of the total heating value per unit volume of said combustible gas, and means for varying the volumetric proportionality of said primary and secondary flows of air in accordance with variations in the value of said thermal effect, to thereby temporarily provide for a predetermined abnormal increase or decrease in the value of said thermal effect upon an increase or decrease, respectively, in the total heating value per unit volume of said combustible gas, whereby the effect of said inherent time delay is compensated for or minimized.

18. In a calorimeter, in combination, means for effecting a continuous volumetrically constant flow of combustible gas, means for effecting combustion of said gas in the presence of a continuous volumetrically proportioned flow of a gaseous fluid adapted to support combustion thereof, means for initially splitting said second flow to provide volumetrically proportioned primary and secondary flows of combustion supporting fluid, means comprising a thermometer resistance, having a normal time lag in response thereof, to be subjected to a thermal effect of the combustion to thereby produce an electrical controlling effect as a function of variations in the rate at which heat is liberated by such combustion, means for utilizing the value of said electrical controlling effect as a measure of the total heating value per unit volume of said combustible gas, and means controlled by a movable part of said calorimeter for varying the volumetric proportionality of said primary and secondary flows of combustion supporting fluid in accordance with variations in the value of said electrical controlling effect, whereby the rate of heat liberation is abnormally increased upon an increase in the total heating value per unit volume of the combustible gas and abnormally decreased upon a decrease in said value, to thereby compensate for the normal time lag of response of said thermo-sensitive electrical element.

19. A calorimetric device for continuously and substantially instantaneously ascertaining the total heating value per unit volume of a combustible gaseous fluid, comprising means for effecting combustion of definitely proportioned quantities of such fluid and another fluid adapted to support combustion thereof, means for continuously supplying said fluids under like conditions of temperature, pressure and saturation, means for mixing said combustible gaseous fluid prior to combustion with a predetermined proportion of said second fluid, means for utilizing the remainder of such second fluid to support and assist in the combustion, means for thermometrically ascertaining a heating effect of such combustion, means for utilizing said heating effect to provide a controlling effect, subject to a time lag, whereby the total heating value per unit volume of said combustible gaseous fluid is indicated, means for additionally and substantially instantaneously ascertaining a heating effect of such combustion to provide a second controlling effect, means for utilizing said second controlling effect to modify the controlling effect first mentioned, to thereby compensate for the time lag in said controlling effect first mentioned, and means for varying the proportion of said second mentioned fluid to be mixed with said combustible gaseous fluid prior to combustion in accordance with variations in a heating effect of such combustion, whereby the rate of heat liberation by said combustion is temporarily increased or decreased, depending upon whether there is an increase or a decrease in the total heating value per unit volume of the combustible gaseous fluid, to thereby compensate for the time lag in said means for providing the controlling effect first mentioned.

EDWIN X. SCHMIDT.